May 23, 1961  H. H. TODD  2,985,551
METHOD OF AND MEANS FOR HEAT PROCESSING METAL
IN AN INERT ATMOSPHERE
Filed July 15, 1957

INVENTOR:
Hoyt H. Todd

By Jess M. Roberts
Attorney

United States Patent Office 2,985,551
Patented May 23, 1961

2,985,551

METHOD OF AND MEANS FOR HEAT PROCESSING METAL IN AN INERT ATMOSPHERE

Hoyt H. Todd, Whittier, Calif., assignor, by mesne assignments, to Superweld Corp., a corporation of California Filed July 15, 1957, Ser. No. 672,050

11 Claims. (Cl. 148—13)

My invention relates to heat processing of metal in an inert atmosphere to prevent oxidation of the metal, not only during the heat processing operation but also during the subsequent cooling period. The invention is particularly directed to the furnace brazing of metal parts that readily oxidize when heated in an oxidizing environment. The present application is a continuation-in-part of my copending application of the same title, Serial No. 597,-124, filed July 11, 1956, now abandoned.

One prior art method for carrying out such a brazing process is to use a furnace that incorporates elaborate provisions for maintaining an inert atmosphere, for example, a hydrogen atmosphere, throughout the brazing process. Since such a furnace represents a large investment and considerable expense is involved in maintaining the hydrogen atmosphere, the cost of the brazing operation is high, and in many instances, prohibitive.

Another prior art expedient is to use a suitable furnace that is not equipped to maintain an inert atmosphere and to place the parts to be brazed in a container filled with an inert gas. For this purpose, the container is made of metal and is sealed tight by welding. If it is not sealed tight, some of the inert gaseous fluid escapes from the container because of expansion during the heating process and then, during the subsequent cooling period, the contraction of the confined inert gaseous fluid results in intrusion of the surrounding atmosphere.

Theoretically, it would be possible to provide a sealed container with a vent passage having a check valve therein to permit escape of the gaseous fluid during the heating process but to prevent return flow from the atmosphere. One disadvantage of such an arrangement is that the check valve may leak with consequent oxidation of the parts being brazed, such leakage being difficult to avoid because of the relatively high pressure differential created during the cooling stage. A more serious disadvantage is that the container must be of extremely heavy construction to withstand the external pressure when the cooling operation creates a relatively high vacuum in the container.

In some instances a container has been used with a conduit maintaining constant communication between the container and a source of inert gas throughout the heating and cooling cycle. Such an arrangement is awkward and is not feasible at all where the articles that are to be brazed are conveyed through a furnace in a continuous process.

A broad object of the present invention is to avoid these disadvantages of various prior art practices and to provide a method and an apparatus for this purpose that minimize the required investment in equipment and also minimize the labor involved in carrying out the brazing operation. In general, this object is attained by placing the parts to be brazed in a closed but unsealed container, placing finely divided reducing material across the paths of communication between the interior of the container and the atmosphere, filling the space in the container with an inert and/or reducing gaseous fluid, heating the container and its contents to a brazing temperature with consequent escape of some of the confined non-oxidizing gaseous fluid to the atmosphere along the paths of communication by reason of heat expansion of the confined gaseous fluid, cooling the container and its contents with consequent inflow of atmosphere along the paths of communication, and consequent reduction of the inflowing atmosphere by the finely divided reducing material.

The finely divided reducing material may comprise well known reducing agents that, once the basic concept is given, would come to the mind of one skilled in the art, it being understood that the reducing agent must react aggressively with oxygen, carbon dioxide, and water vapor at temperatures ranging from 2100° F. down to approximately 500°.

Finely divided chromium, manganese, silicon, titanium, boron, aluminum, magnesium and calcium, as well as alloys and compounds containing high percentages of these elements, may be used. The selected reducing material or materials is preferably of a particle size smaller than minus 60-mesh to provide a relatively large total area for treating the inflowing atmosphere.

It is contemplated that the atmosphere drawn into the closed container by contraction of the gaseous content during the cooling period will be divided into numerous streams of exceedingly small cross section in contact with the finely divided material, since such a mode of operation minimizes the lengths of the paths of flow necessary for complete reduction of the intruding atmosphere. The finely divided reducing material may, itself, serve the purpose of dividing the inflowing atmosphere into small streams, but it is more practical and economical to mix finely divided inert material with the finely divided reducing material. Any nonhygroscopic, nonreducing solid material may be used that is inert to the reducing material, that does not absorb oxygen, and does not melt at the brazing temperature, say a temperature of 2200° F. Suitable inert materials for this purpose include anhydrous aluminum oxide, magnesium oxide and silica.

The invention may be fully understood by considering specific practices of the basic concept as illustrated by the accompanying drawing.

In the drawing, which is to be regarded as merely illustrative:

Figure 1:
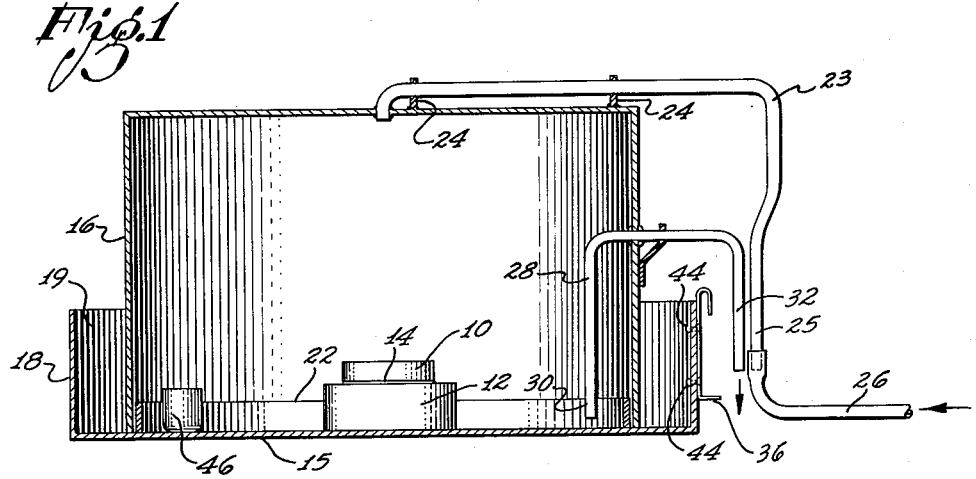
Fig. 1 is a sectional view of one form of apparatus that may be used for practicing the invention.
Figure 2:
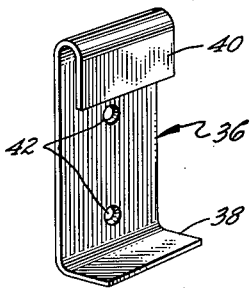
Fig. 2 is a perspective view of a bracket that is incorporated in the construction shown in Fig. 1.
Figure 3:
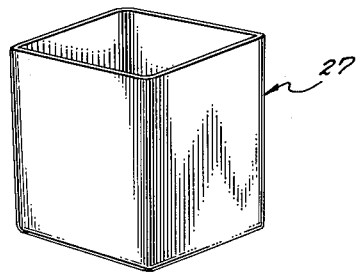
Fig. 3 is a perspective view of a cup for holding a quantity of the finely divided material, the cup being releasably mounted on the bracket to close the end of the tube shown in Fig. 1.

The drawing shows, by way of example, two metal parts 10 and 12 positioned together with a deposit 14 of brazing composition between the two parts in preparation for brazing operation which consists of heating the two metal parts in a furnace to a temperature high enough to melt the brazing composition. The two parts 10 and 12 may, for example, be made of stainless steel which would be corroded in the course of a conventional brazing operation performed in an ordinary atmosphere.

Figure 4:
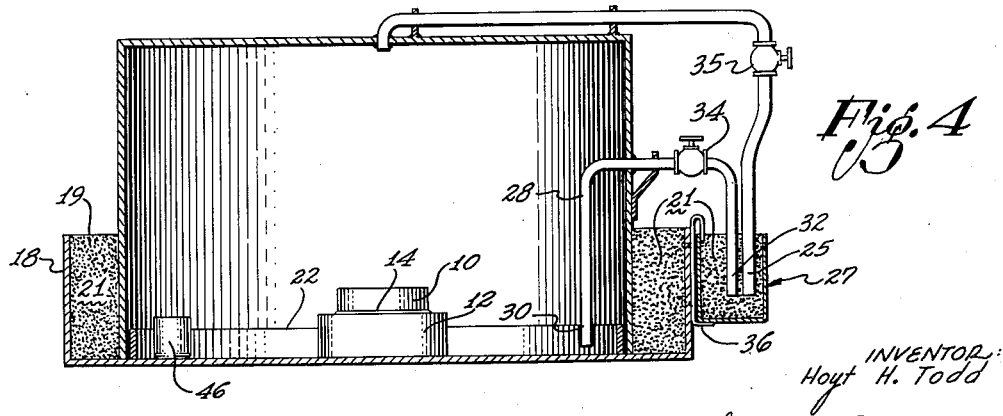
Fig. 4 is a view similar to Fig. 1 showing the apparatus ready for the brazing furnace with all the paths of fluid flow into and out of the apparatus blocked by the finely divided reducing material.

The apparatus shown in Figs. 1 and 4 is essentially a container comprising a circular pan 15 and a cylindrical cover or closure 16, these two members being made of any suitable metal. For example, the pan and cover may be made of 14-gauge metal and the diameter of the cover may be on the order of 14 inches for processing relatively small metal parts.

The circular pan 15 is larger in diameter than the cover 16 and has an upwardly extending cylindrical wall 18. When the cover 16 is positioned in the circular pan to rest on the bottom thereof, as shown in Figs. 1 and 4, the pan forms therewith an annular trough 19 in which a quantity of finely divided material 21 may be placed as shown in Fig. 4. Thus the procedure of placing the work pieces 10 and 12 in the pan 15, placing the cover 16 in the pan centrally thereof, and filling the trough 19 with the finely divided material 21 cuts off the interior of the cover from the atmosphere except for the exceedingly large number of paths of communication with the atmosphere under the edge of the cover and through the annular mass of finely divided material 21. Preferably the pan 15 is provided with a low circular upright wall 22 that fits telescopically inside the cover 16 as shown to minimize the tendency of the finely divided material to be blown into the interior of the container by the intrusion of atmosphere during the cooling stage of the heating cycle.

The apparatus shown in the drawing further includes a metal inlet tube 23, which may be ¼-inch tubing. The inlet tube 23 is connected with the top of the cover 16 and is supported thereon by a pair of rigid supports 24. The inlet tube 23 is turned downward with its second end 25 positioned to extend adjacent the side of the pan 15 as shown. A hose 26 connected to a suitable source of inert gas (not shown) may be slipped over the end 25 of the inlet tube 23 for the purpose of forcing the inert gas into the interior of the container to replace the oxidizing atmosphere therein. In the present practice of the invention it is contemplated that the hose 26 will be connected to a supply of compressed hydrogen gas.

The cover 16 may be further provided with an exhaust tube 28 which may comprise ⅜-inch metal tubing. As shown, the exhaust tube 28 is U-shaped with its inner end 30 close to the level of the bottom edge of the cover 16 and with its outer end 32 positioned adjacent the end 25 of the inlet tube 23. The exhaust tube 28 may be provided with a cutoff valve 34 and the inlet tube 23 may be provided with a similar cutoff valve 35.

The preferred practice of the invention further includes a cup 27 to hold a quantity of the finely divided reducing material 21 to block the outer ends of the two tubes 23 and 28 after the interior of the container has been filled with inert gas. The cup 27 may be of rectangular configuration as shown and may be releasably retained by a suitable bracket 36. The bracket 36 comprises a strip of metal with a bottom flange 38 to engage the bottom of the cup 27 and an overhanging top flange 40 to engage the rim of the cup. The bracket 36 is shown with holes 42 to receive screws 44 by means of which it is mounted on the cylindrical wall 18 of the circular pan 15.

In the preferred procedure for practicing the invention, the metal parts 10 and 12 prepared with the brazing material 14 are placed in the circular pan 15 and the cover 16 is placed in position in the pan as shown. The finely divided reducing material 21 is then placed in the trough 19 as shown in Fig. 4. The hose 26 then is connected to the inlet tube 23 as shown in Fig. 1 for the introduction of hydrogen gas to replace the oxidizing air inside the container.

Since the path of least resistance from the interior of the container to the surrounding atmosphere is through the exhaust tube 28 rather than through the finely divided material 21, the oxidizing air from the interior of the container is displaced into the atmosphere through the exhaust tube rather than through the finely divided material. This fact conserves the reducing potential of the finely divided material until it is needed to render incoming air inert during the subsequent cooling stage of the heating cycle. The two valves 34 and 35 are left open throughout this procedure and are not used at all in this preferred practice of the invention.

After the hydrogen gas has completely replaced the original oxidizing air inside the container, the hose 26 is disconnected from the inlet tube 23 and the cup 27 filled with the inert material 21 is lifted into place on the bracket 36 with the ends of the inlet tube 23 and the exhaust tube 28 buried in the finely divided reducing material in the cup as shown in Fig. 4. The apparatus is then placed on a conveyor that passes through the brazing furnace. There is no problem involved in the passage of the apparatus through the brazing furnace on the conveyor since the apparatus is completely disconnected from the source of hydrogen gas and is as freely movable as the conventional trays that are customarily used for parts that are to be brazed.

The rise in temperature of the container in the brazing furnace causes expansion of the inert gas inside the container with consequent escape of a portion of the inert gas to the atmosphere through the finely divided material 21. During the subsequent cooling stage the inert gas in the container contracts with consequent inflow of the surrounding oxidizing atmosphere into the container through the finely divided material 21. The finely divided material 21 provides an exceedingly large number of paths of communication of exceedingly small section, and, since the finely divided material is substantially uniformly distributed in depth around the cover 16, the resistance to flow along the numerous paths of communication is substantially uniform and the flow is substantially equally divided among the numerous paths. Consequently, all of the inflowing air is completely reduced before it reaches the bottom edge of the cover 16.

The described procedure may be modified by simply closing the two valves 34 and 35 instead of using the cup 25 filled with the finely divided reducing material to block the entrances to the two tubes 23 and 28. The described procedure is preferred, however, because it eliminates the need for valves and because it eliminates any difficulties that may arise because of defective valves or because of failure to close a valve. The described procedure is further desirable because it increases the number of paths that are available for atmospheric inflow through the finely divided reducing material and thus reduces the burden placed on each of the minute passages.

To carry out an alternate procedure with the described apparatus, the valve 34 of the exhaust tube 28 is kept closed and for this reason the exhaust tube may be completely eliminated. The finely divided reducing material 21 is positioned in the trough 19 around the cover 16 in the usual manner and the hose 26 is connected to the inlet tube 23 to admit hydrogen gas into the interior of the cover 16. In this procedure, the atmospheric air inside the container that is replaced by the hydrogen gas flows outward under the rim of the cover 16 and through the finely divided material. It has been found that with a container of approximately 14 inches in diameter, there will be enough finely divided material for this practice of the invention if the trough 19 is at least ½ inch wide and if the finely divided material is of a depth of approximately 3½ inches. In this second procedure the valve 35 may be turned off during the brazing operation or, if desired, the cup 27 with finely divided material 21 therein may be employed in the previously described manner to block the entrance into the inlet tube 23.

In some practices of the invention, it may be helpful to pour some of the finely divided reducing material on the bottom of the pan 15 inside the cover 16 for reducing effect on the gaseous content of the container. For the same purpose a small open top receptacle 46 may be placed in the pan 15 in the region of the metal parts that are to be brazed and approximately 30 grams of titanium or magnesium in finely divided state may be placed in the receptacle for each cubic foot of space in the container. The titanium or magnesium may be in the form of granules or chips. Instead of the pure metals, hydrides of titanium or magnesium may be used since such hydrides, when heated, yield additional hydrogen.

The finely divided material 21 may be entirely a qualified reducing agent such as is included in the above list. In the present practice of the invention, however, the finely divided material 21 comprises a mixture of the following ingredients:

100 pounds ferromanganese, minus 40-mesh
80 pounds anhydrous aluminum oxide, minus 100-mesh
10 pounds aluminum powder minus, 40-mesh
10 pounds calcium silicate minus, 40-mesh The ferromanganese is relatively inexpensive and is especially suitable for the purpose of the invention because it is capable of thorough oxidation in constrast to other reducing agents, for example chromium, which tend to form a protective oxide coating. In some practices of the invention, finely divided ferromanganese may be used alone. Ferromanganese should not be used alone, however, if the metal objects to be brazed are titanium alloys or are made of high silicon iron.

The aluminum power is a stronger deoxidizer than the ferromanganese and serves to keep the dew point lower than is possible with ferromanganese alone. Lowering the dew point means reduction of moisture and consequently a stronger reducing effect. Stainless steel requires a low dew point to stay bright.

The calcium silicate has more than one function. In the first place, it gives off calcium vapor to lower the dew point. In the second place, the calcium vapor scavenges the oxides and gases from the metal surfaces to cause the brazing metal to flow or spread. In the third place, the calcium silicate gives off calcium vapor which helps to scavenge air out of the finely divided mixture. All alkali metals and alkaline earth metals have the same effect as calcium silicate to some extent. For example, lithium carbonate may be substituted for calcium silicate with satisfactory results. It is possible to reduce the aluminum content with corresponding increase in the amount of calcium silicate but if the mixture is changed too much in this direction, the melting point of the mixture drops so low as to result in a troublesome tendency for the mixture to cake.

The anhydrous aluminum oxide is an inert material that tends to keep the mixture porous and to keep the mixture from caking by a sintering action into a hard mass. A mixture of the proportions set forth above will sinter to some extent but any sintered mass is quite friable and therefore may be easily removed after the brazing operation.

The described practice of the invention gives excellent results where the furnace has an exothermic atmosphere that is reducing to iron oxide but is not reducing to chromium oxide. Such an atmosphere is commonly provided in electric furnaces employed for continuous brazing operations. If the atmosphere in the furnace is not reducing to iron oxide, for example if the furnace atmosphere is air, it is advantageous to include 10 to 40% of carbon in the finely divided mixture. Thus 40 parts by weight of graphite (minus 60-mesh) may be added to 60 parts of the above-described mixture. At elevated temperatures the carbon partially reduces air to CO and thus lessens the reducing burden that is placed on the other active ingredients of the mixture.

For some practices of the invention, an alternate mixture of finely divided materials may be employed as follows:

100 pounds silica sand, minus 30-mesh
100 pounds ferromanganese, minus 80-mesh
20 pounds graphite, minus 60-mesh The silica sand and the graphite are inert materials that tend to keep the mixture porous. This alternate mixture will, however, cake or sinter much more readily than the first mixture.

My description herein of selected practices of the invention will suggest various changes, substitutions and other departures from my disclosure within the spirit and scope of the appended claims.

I claim as my invention:

1. In the processing of a metal object prone to oxidation at high temperatures, wherein the metal object is subjected to a high temperature environment for a heating cycle, a method of protecting the metal object from oxidation during the heating cycle, including the steps of: enclosing the metal object in a container; providing a passage for flow communication between the interior of the container and the surrounding atmosphere; connecting the container to a source of nonoxidizing gaseous fluid under pressure to replace the air in the container with the gaseous fluid; disconnecting the container from said source for freedom of movement of the container completely independently of the source; and placing a quantity of reducing agent in finely divided solid form in said passage prior to the heating cycle to retard gaseous flow through the passage and to remove oxidizing constituents from the gaseous flow whereby the expansion of the enclosed gaseous fluid in the heating stage of the cycle results in discharge through said passage of a portion of the nonoxidizing gaseous fluid and the contraction of the enclosed nonoxidizing gaseous fluid during the cooling stage results in inflow of atmosphere through said passage with conversion of the inflowing atmosphere to inert gaseous fluid by said reducing agent.

2. A method as set forth in claim 1 in which the major portion of said finely divided material comprises ferromanganese and anhydrous aluminum oxide.

3. A method as set forth in claim 1 in which said finely divided material includes ferromanganese and aluminum.

4. A method as set forth in claim 1 in which said finely divided reducing material is mixed with a finely divided ingredient selected from a group consisting of alkali metals and alkaline earth metals.

5. A method as set forth in claim 4 in which said finely divided reducing material is mixed with an ingredient selected from a group consisting of calcium silicate and lithium carbonate.

6. In the processing of a metal object prone to oxidation at high temperatures, wherein the metal object is subjected to a high temperature environment for a heating cycle, a method of protecting the metal object from oxidation during the heating cycle characterized by the use of a container having an unsealed closure and two passages for communication between the interior and exterior of the container, said method including the steps of: placing the object in the container with said closure closed; distributing a quantity of reducing agent in finely divided solid form around said closure to intercept and retard flow of gaseous fluid into and out of the container past the closure; forcing nonoxidizing gaseous fluid into the container through one of said two passages to replace the air therein whereby the replaced air is discharged through the other of the two passages; closing off said two passages; and then subjecting said container to the heating cycle whereby, first, the enclosed gaseous fluid expands with consequent leakage through said finely divided reducing agent and subsequently the enclosed nonoxidizing gaseous fluid contracts with consequent inflow of ambient atmosphere through said finely divided reducing agent and reduction of the inflowing atmosphere by the reducing agent.

7. In the heat processing of metal in an inert atmosphere, wherein the metal is placed in a container of heat-resisting material filled with a nonoxidizing gaseous fluid from a supply source and the container is heated for heat processing of the metal therein with consequent expansion of gaseous fluid and then is cooled with consequent contraction of the confined gaseous fluid, the improvement which consists in using the fluid-filled container completely disconnected from said source in unsealed state and placing a quantity of a reducing agent in finely divided solid form across all the paths of gaseous fluid flow into and out of the unsealed container, whereby the introduction of the surrounding atmosphere caused by the contraction of the confined nonoxidizing gaseous fluid in the cooling period results in inflow of the atmosphere through the finely divided material with consequent reduction of the inflowing atmosphere.

8. In the brazing of metal parts prone to oxidation at high temperature by a procedure which includes placing the metal parts on a conveyor for travel through a brazing furnace, the improvement which consists of placing the metal parts in an unsealed container; placing a quantity of a reducing agent in finely divided solid form across all paths of fluid flow into and out of the unsealed container; connecting the container with a source of nonoxidizing gaseous fluid to replace the air in the container by the gaseous fluid; disconnecting the container from the source; and then placing the container on the conveyor for travel through the furnace, whereby heating of the confined nonoxidizing gaseous fluid in the furnace with consequent expansion thereof causes leakage of the confined nonoxidizing gaseous fluid through the finely divided reducing agent and the subsequent cooling of the remaining confined gaseous fluid with consequent contraction thereof causes inflow of ambient atmosphere through the finely divided reducing material and reduction of the oxidizing constituents of the inflowing atmosphere by the finely divided reducing material.

9. A combination for protecting metal from oxidation during a heating operation and a following cooling period, comprising: a container of heat-resisting material to enclose the metal, said container having an access opening; a closure for said access opening with clearance for gaseous fluid flow into and out of the container around the enclosure; a quantity of finely divided solid material extending across said clearance to retard gaseous fluid flow into and out of the container and to divide such flow into numerous fine streams, said finely divided material including a reducing agent effective below 500° F.; and an inlet passage for gaseous fluid flow into said container for releasable connection with a source of compressed nonoxidizing gaseous fluid for replacing the air in the container with the gaseous fluid; a second passage for flow of the displaced air out of the container to keep the displaced air from flowing through said finely divided material; and means to close said passages.

10. A combination as set forth in claim 9 which includes means to block the outer ends of both of said passages with finely divided material including a reducing agent effective below 500° F. to reduce atmosphere flowing into the two passages.

11. A combination as set forth in claim 10 in which said blocking means comprises a receptacle to hold a quantity of the finely divided reducing material, said receptacle being removably mounted on the exterior of said container.

References Cited in the file of this patent

UNITED STATES PATENTS

| | | |
|---|---|---|
| 1,673,271 | Stewart | June 12, 1928 |
| 1,709,658 | Colby | Apr. 16, 1929 |
| 1,815,691 | Wilson | July 21, 1931 |
| 1,870,126 | Lewis | Aug. 2, 1932 |
| 1,898,674 | Lewis | Feb. 21, 1933 |
| 1,914,403 | Cope | June 20, 1933 |
| 1,944,743 | Kelly | Jan. 23, 1934 |
| 2,050,305 | Frey et al. | Aug. 11, 1936 |
| 2,152,154 | Robiette | Mar. 28, 1939 |